United States Patent
Li et al.

(10) Patent No.: US 6,178,044 B1
(45) Date of Patent: Jan. 23, 2001

(54) METHOD AND SYSTEM FOR PROVIDING AN OPTICAL CIRCULATOR

(75) Inventors: Wei Zhong Li, San Jose; Yan Tang, Cupertino, both of CA (US)

(73) Assignee: Oplink Communications, Inc., San Jose, CA (US)

( * ) Notice: Under 35 U.S.C. 154(b), the term of this patent shall be extended for 0 days.

(21) Appl. No.: 09/387,206

(22) Filed: Aug. 31, 1999

(51) Int. Cl.$^7$ .................................................. G02B 5/30
(52) U.S. Cl. ................ 359/484; 359/495; 359/497; 359/900; 359/282; 372/703; 385/11; 385/27; 385/33; 385/36; 385/39
(58) Field of Search ..................... 359/484, 487, 359/494, 495, 496, 497, 281, 282, 283, 900; 372/703; 385/11, 15, 27, 31, 33, 34, 36, 39

(56) References Cited

U.S. PATENT DOCUMENTS

| | | | |
|---|---|---|---|
| 4,272,159 | * 6/1981 | Matsumoto | 359/484 |
| 4,464,022 | * 8/1984 | Emkey | 359/484 |
| 4,650,289 | * 3/1987 | Kuwahara | 359/484 |
| 4,702,557 | * 10/1987 | Beckmann et al. | |
| 5,212,586 | * 5/1993 | Van Delden | 359/484 |
| 5,402,509 | * 3/1995 | Fukushima | 385/11 |
| 5,689,359 | * 11/1997 | Kurata et al. | 359/487 |
| 5,689,593 | * 11/1997 | Pan et al. | 359/495 |
| 5,909,310 | * 6/1999 | Li et al. | 359/484 |
| 5,982,539 | * 11/1999 | Shirasaki | 359/484 |

FOREIGN PATENT DOCUMENTS

| | | | |
|---|---|---|---|
| 0014205 | * 2/1981 | (JP) | 359/484 |
| 0218619 | * 11/1985 | (JP) | 359/484 |
| 0122624 | * 6/1986 | (JP) | 359/484 |
| 406242401 | * 9/1994 | (JP) | 359/496 |

* cited by examiner

Primary Examiner—Ricky D. Shafer
(74) Attorney, Agent, or Firm—Sawyer Law Group LLP

(57) ABSTRACT

A method and system for providing an optical circulator is disclosed. The optical circulator includes a first port, a second port, a third port, and means for establishing a first optical path and a second optical path. The first optical path is from the first port to the second port. The second optical path is from the second port to the third port. The optical path establishing means also includes a wedge and a first birefringent material. The wedge intersects the second optical path but not the first optical path. The wedge is for ensuring that the second optical path includes the third port but not the first port. The wedge does so by deflecting an optical signal input from the second port, but not an optical signal from the first port. The first birefringent material intersects the first optical path and the second optical path and is disposed between the wedge and the second port along the second optical path. The first birefringent material is for ensuring that the second optical path includes the third port but not the first port and for ensuring that the first optical path includes the second port.

14 Claims, 5 Drawing Sheets

METHOD AND SYSTEM FOR PROVIDING AN OPTICAL CIRCULATOR

FIELD OF THE INVENTION

The present invention relates to optical technology, and more particularly to a method and system for providing an optical circulator.

BACKGROUND OF THE INVENTION

Conventional optical circulators are employed in systems transmitting optical signals in order to transmit optical signals in a particular direction. For example, in a three port optical circulator, an optical signal input at the first port will be transmitted to the second port. An optical signal input at the second port will be transmitted to the third port. However, optical signals will not be transmitted in the reverse direction. For example, an optical signal input at the second port will not be transmitted to the first port.

Although conventional optical circulators function, they typically include a large number of elements. Furthermore, the path the optical signal travels, known as the optical path, is typically relatively long. Consequently, additional losses are introduced, reducing the amplitude of the optical signal.

Accordingly, what is needed is a system and method for providing an optical circulator having reduced losses. It would also be beneficial if the optical circulator was less expensive. The present invention addresses such a need.

SUMMARY OF THE INVENTION

The present invention provides a method and system for providing an optical circulator. The optical circulator comprises a first port, a second port, a third port, and means for establishing a first optical path and a second optical path. The first optical path is from the first port to the second port. The second optical path is from the second port to the third port. The optical path establishing means also includes a wedge and a first birefringent material. The wedge intersects the second optical path but not the first optical path. The wedge is for ensuring that the second optical path includes the third port but not the first port. The wedge does so by deflecting an optical signal input from the second port, but not an optical signal from the first port. The first birefringent material intersects the first optical path and the second optical path and is disposed between the wedge and the second port along the second optical path. The first birefringent material is for ensuring that the second optical path includes the third port but not the first port and for ensuring that the first optical path includes the second port.

According to the system and method disclosed herein, the present invention provides an optical circulator which can be made smaller and more cheaply than conventional optical circulators.

DETAILED DESCRIPTION OF THE INVENTION

The present invention relates to an improvement in optical technology. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 1:
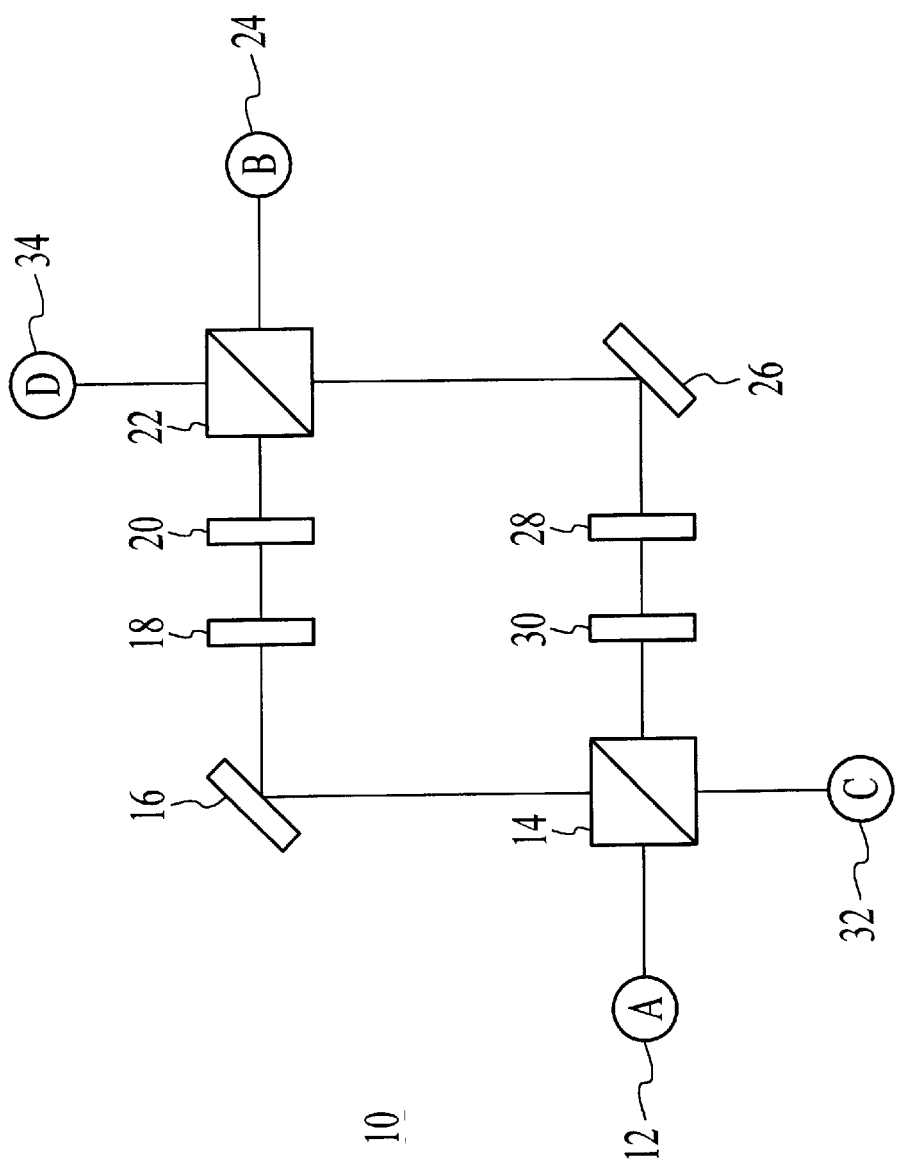
FIG. 1 is a diagram of a conventional optical circulator.

Optical circulators are used to transmit optical signals in one direction between ports, but not in the reverse direction. For example, U.S. Pat. No. 4,650,289 by Kuwahara describes some conventional optical circulators. FIG. 1 is a diagram of one such conventional optical circulator 10. The conventional optical circulator includes four ports, port A 12, port B 24, port C 32, and port D 34. The conventional optical circulator also includes polarizer prisms 14 and 22, mirrors 16 and 26, Faraday rotators 18, and optically active elements 20 and 28. The polarizer prisms 14 and 22 transmit light in different directions depending on the polarization of the light. One of ordinary skill in the art will understand that the polarization of any optical signal can be divided into two mutually orthogonal directions, both of which are also perpendicular to the direction of propagation of the light. Light polarized in the first direction is transmitted undeflected by the polarizer prisms 14 and 22. Light polarized in the second direction is transmitted at an angle of ninety degrees from the first direction. The mirrors 16 merely reflect light without a change in polarization. The Faraday rotators 18 and 30 rotate the direction of polarization of incident light by forty-five degrees in a particular direction regardless of the direction in which light traverses the Faraday rotators 18 and 30. For example, the Faraday rotator 18 rotates the polarization of light from the mirror 16 in the same direction as light from the optically active element 20. Optically active elements 20 and 28 rotate the polarization of incident light by forty-five degrees. However, the direction that the polarization is rotated depends upon the direction in which the light traverses the optically active elements 20 and 28. For example, optically active element 20 will rotate light from the Faraday rotator 18 and having one polarization by forty-five degrees in a particular direction. The optically active element 20 will rotate light from the polarizer prism 22 having the same polarization by forty-five degrees in the opposite direction.

Thus, an optical signal incident on the port A 12 will travel a path through the mirror 16, a path through the optically active element 20, of a path depending on the polarization of the optical signal. However, the elements of the conventional optical circulator 10 are chosen such that the portion of the optical signal from port A 12 that is reflected from mirror 26 will have a polarization it to be transmitted at ninety degrees by the polarizer prism 22. Similarly, the elements of the conventional optical circulator 10 are chosen such that the portion of the optical signal from port A 12 that is transmitted by the optically active element 20 will have a polarization such that it will be transmitted undeflected by the polarizer prism 22. Thus, an optical signal from port A 12 will reach port B 24, but not be transmitted to port C 32 or port D 34. Similarly, an optical signal from port B 24 will reach port C 32, but not port A 12 or port D 34. An optical signal from port C 32 will reach port D 34, but not port A 23 or port B 24 for the same reasons. Finally, an optical signal from port D 34 will be transmitted to port A 12, but not port B 24 or port C 32.

Although the conventional optical circulators, such as the conventional optical circulator 10 shown in FIG. 1, function, one of ordinary skill in the art will readily realize that many of the components of the conventional optical circulators are relatively expensive. Furthermore, the optical paths in conventional optical circulators may be relatively long. Thus, losses during transmission of an optical signal are increased.

The present invention provides a method and system for providing an optical circulator. The optical circulator comprises a first port, a second port, a third port, and means for establishing a first optical path and a second optical path. The first optical path is from the first port to the second port. The second optical path is from the second port to the third port. The optical path establishing means also includes a wedge and a first birefringent material. The wedge intersects the second optical path but not the first optical path. The wedge is for ensuring that the second optical path includes the third port but not the first port. The wedge does so by deflecting an optical signal input from the second port, but not an optical signal from the first port. The first birefringent material intersects the first optical path and the second optical path and is disposed between the wedge and the second port along the second optical path. The first birefringent material is for ensuring that the second optical path includes the third port but not the first port and for ensuring that the first optical path includes the second port.

The present invention will be described in terms of an optical circulator having specific components having a specific configuration. Similarly, the present invention will be described in terms of optical circulator components having specific relationships, such as distances or angles between components. However, one of ordinary skill in the art will readily recognize that this method and system will operate effectively for other components having similar properties, other configurations, and other relationships between components.

Figure 2A:
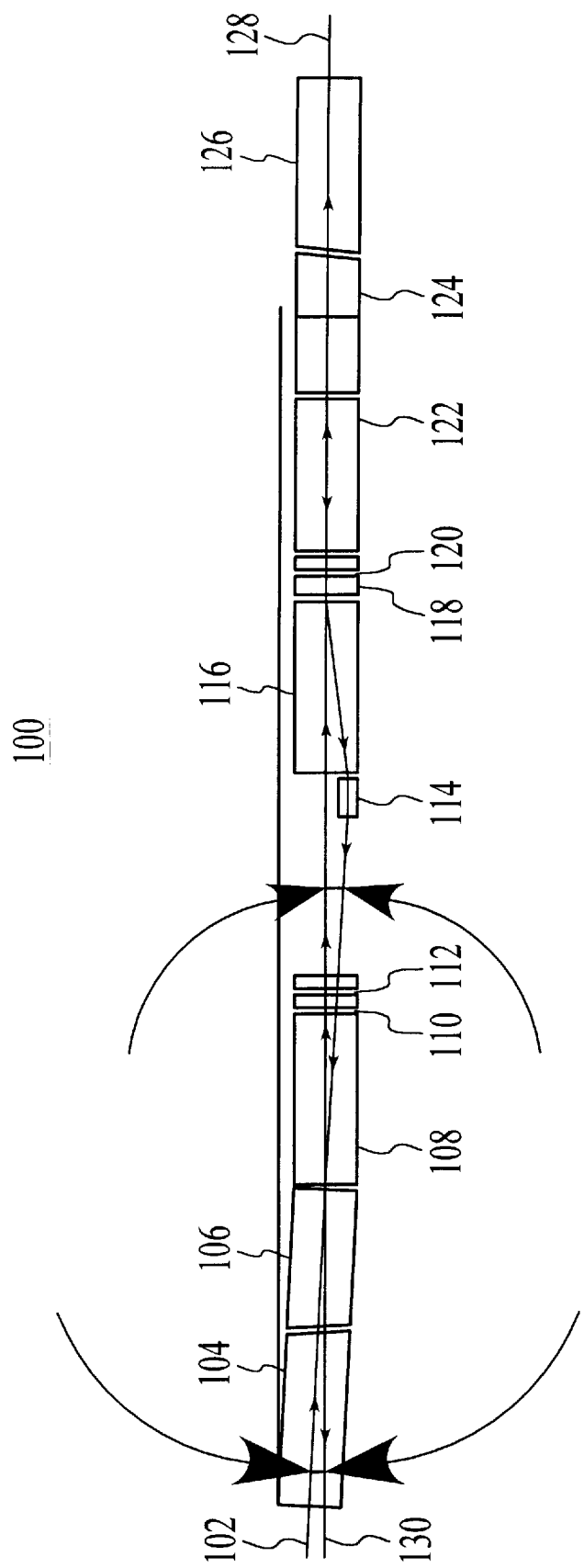
FIG. 2A depicts a side view of one embodiment of an optical circulator in accordance with the present invention.
Figure 2B:
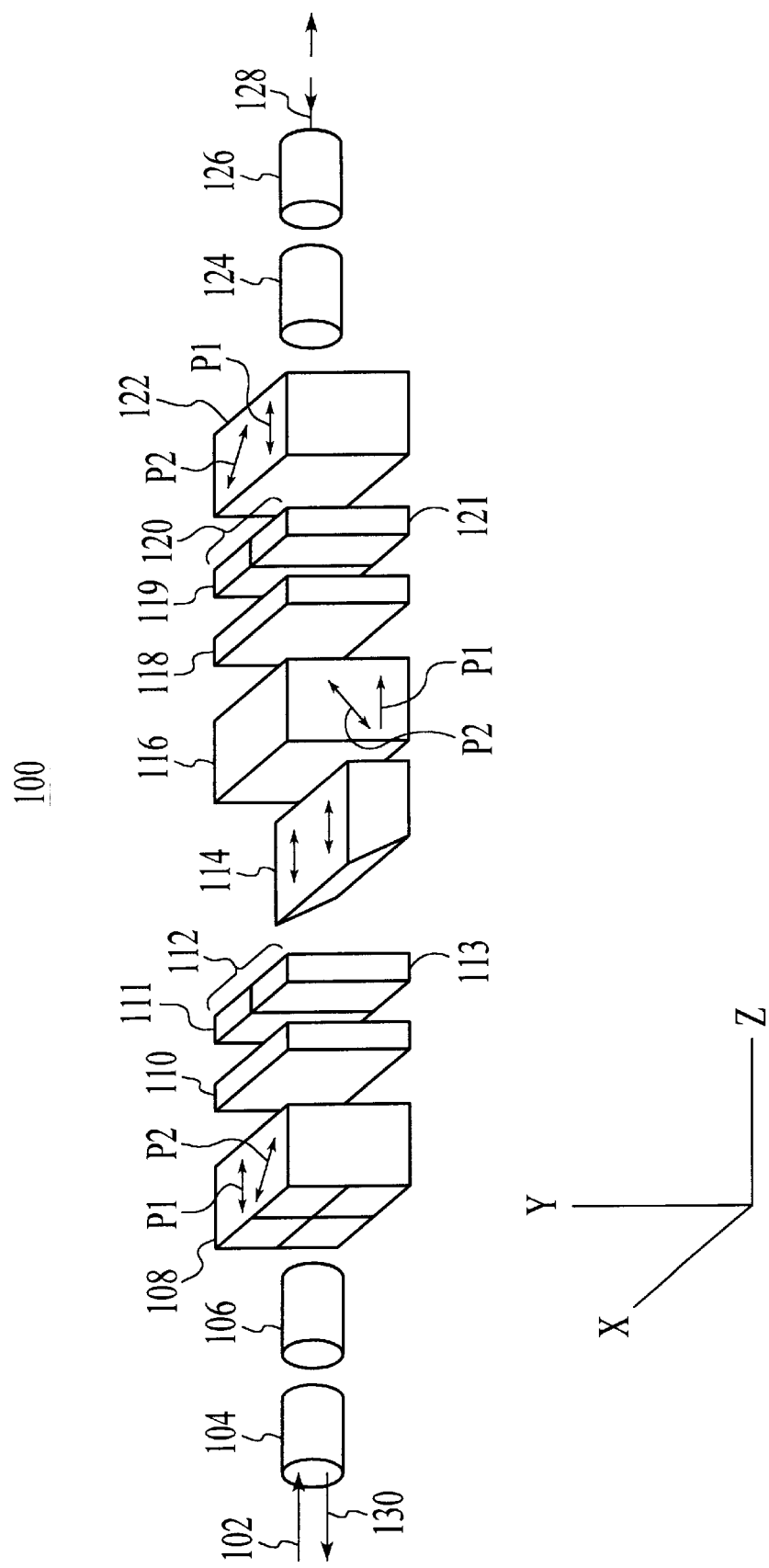
FIG. 2B depicts a perspective view of the embodiment of an optical circulator in accordance with the present invention.

To more particularly illustrate the method and system in accordance with the present invention, refer now to FIGS. 2A and 2B, depicting one embodiment of an optical circulator 100 in accordance with the present invention. FIG. 2A depicts a side view of the optical circulator 100. FIG. 2B depicts a perspective view of the optical circulator 100. The optical circulator 100 includes three ports, a first port 102, a second port 128, and a third port 130. The first port 102 includes a first fiber. The second port 128 includes a second fiber. The third port 130 includes a third fiber. The optical circulator 100 is configured such that an optical signal input to the first port 102 will be provided to the second port 128 along a first optical path and an optical signal input to the second port 128 will be provided to the third port 130 along a second optical path. However, an optical signal input to the first port 102 will not be transmitted to the third port 130. Similarly, an optical signal input to the second port 128 will not be provided to the first port 102.

The optical circulator 100 also includes a first holder 104, a first lens 106, a second lens 124 and a second holder 126. The first holder is preferably a glass capillary and holds the fibers for the first port 102 and the third port 130. The second holder 126 is preferably a glass capillary and holds the fiber for the second port 128. The lenses 106 and 124 are preferably graduated index of refraction (GRIN) lenses.

In order to establish the first and second optical paths, the optical circulator 100 includes a first birefringent material 108, a first Faraday rotator 10, a first pair of half wave plates 112, a wedge 114, a second birefringent material 116, a second Faraday rotator 118, a second pair of half wave plates 120, and a third birefringent material 122. The first pair of half wave plates 112 includes a first half wave plate 111 and a second half wave plate 113. Similarly, the second pair of half wave plates 120 includes a third half wave plate 119 and a fourth half wave plate 121. The first birefringent material 108, the first Faraday rotator 110, the first pair of half wave plates 112, the second birefringent material 116, the second Faraday rotator 118, the second pair of half wave plates 120, and the third birefringent material 122 intersect both the first and the second optical paths. However, the wedge 114 intersects the second optical path, but not the first optical path.

The wedge 114 deflects an optical signal from the second port 128 to the third port, but not an optical signal from the first port 102. The wedge 114 deflects the optical signal from the second port 128 to compensate for the difference in angles between the fiber for the first port 102 and the fiber for the third port 130. Consequently, an optical signal input from the fiber of the first port 102 travels along the first optical path to the second port 128, while an optical signal input from the fiber of the second port 128 travels along the second optical path to the third port 130.

The angle between the fiber for the first port 102 and the fiber for the third port 130 is preferably between about 1.8 and three degrees. In a preferred embodiment, this angle is approximately 1.89 degrees. The angular separation between the first optical path and the second optical path as measured from the outer edge of the first birefringent material 108 is preferably between approximately 3.6 degrees and six degrees. In a preferred embodiment, the angular separation between the first and second optical paths is approximately 3.78 degrees. The optical circulator 100 is also preferably compact. In a preferred embodiment, the total length of the optical circulator 100 is less than fifty millimeters. Also in a preferred embodiment the length of the optical circulator 100 between the first birefringent material 108 and the third birefringent material 122 is less than twenty-seven millimeters.

Based on the function of each of the components of the optical circulator 100 and the relationship between the components of the optical circulator 100, the optical circulator 100 can provide the first and second optical paths for optical signals of various polarizations. Preferably, an optical signal input at the first port 102 or the second port 128, is split into two portions based on the polarization state. A first polarization state of a first portion of the optical signal is rotated to a second polarization state as the light traverses the optical circulator 100. The second polarization state of a second portion of the optical is rotated to the first polarization state as the light traverses the optical circulator 100. However, the directions that the polarization states are rotated by individual components of the optical circulator 100 could depend upon the particular embodiment of the optical coupler 100.

The first, second, and third birefringent materials 108, 116, and 122, respectively, treat light having a first polarization state differently from light having a second polarization state. The first birefringent material 108 transmits light having a first polarization state undeflected. The first birefringent material 108 also transmits light having a second polarization state with a deflection, shown in FIG. 2B. The deflection is shown as being horizontal and substantially perpendicular to the direction of propagation. The deflection for light having the second polarization state is both substantially horizontal and in a plane substantially parallel to the surface of the first birefringent material 108. The second birefringent material 116 also transmits light having the first polarization state. However, the second birefringent material deflects light having the second polarization state. The deflection due to the second birefringent material 116 is vertical, rather than horizontal. Thus, as shown in FIG. 2A, light having the second polarization state may be deflected down, through the wedge 114. The third birefringent material 122 transmits light having the first polarization state. The third birefringent material 122 also transmits light having the second polarization state with a deflection that is horizontal and perpendicular to the direction of propagation. Thus, the third birefringent material 122 behaves similarly to the first birefringent material 108. For example, light having the second polarization state and traveling towards the second port 128 is deflected approximately out of the plane of the page (in the −x direction) by the first birefringent material 108. Similarly, the third birefringent material deflects light having the second polarization state and traveling to the second port 128 out of the plane of the page (in the −x direction). Furthermore, the deflections due to the first birefringent material 108 and the third birefringent material 122 have approximately the same magnitude. As a result, a single optical signal that is split by the first birefringent material 108 may be combined by the third birefringent material 122. For example, the third birefringent material deflects light from the second port 128 having the second polarization state, but does not deflect light from the second port 128 having the first polarization state.

The Faraday rotators 110 and 118 rotate the polarization of light in the same direction. Each of the Faraday rotators 110 and 118 has an axis and rotates the polarization of an optical signal by forty-five degrees around its axis. Preferably, the axes of the Faraday rotators 110 and 118 are approximately parallel to the direction of propagation of an optical signal traveling along the first path. However, the second Faraday rotator 118 preferably rotates the polarization of light in the opposite direction to the rotation caused by the first Faraday rotator 110. For example, if the first Faraday rotator 110 rotates the polarization of light by forty-five degree clockwise, the second Faraday rotator 118 will rotate the polarization of light by forty-five degrees counterclockwise.

The first pair of half wave plates 112 and the second pair of half wave plates 120 each rotates the polarization of light in two directions. Each plate 111 and 112 of the first pair of half wave plates has an axis. However, these axes are preferably substantially parallel and thus are considered to be a single axis for the first pair of half wave plates 112. Similarly, each plate 119 and 121 of the second pair of half wave plates 120 has an axis. These axes are preferably substantially parallel and thus are considered to be a single axis for the second pair of half wave plates 120. Furthermore, the axis of the first pair of half wave plates 112 is substantially parallel to both the axis of the second pair of half wave plates 120 and the direction or propagation of an optical signal along the first optical path. In one embodiment, the first half wave plate 111 and the third half wave plate 119 rotate light by forty-five degrees in a first direction around the axis. In one embodiment, the second half wave plate 113 and the fourth half wave plate 121 preferably rotate light by forty-five degrees in the opposite direction around the axis. In such an embodiment, the first half wave plate 111 rotates the polarization of incident light in the same direction as the first Faraday rotator 110. The fourth half wave plate 121 rotates the polarization of incident light in the same direction as the second Faraday rotator 118. Although the components of the above-mentioned embodiment rotate polarizations in particular directions, nothing prevents the use of components which rotate the polarization of light in other directions. However, the combination of the Faraday rotators 110 and 118 and the pairs of half wave plates 112 and 120 could rotate the polarization of light in other directions. The combination of Faraday rotators 110 and 118 and the pairs of half wave plates 112 and 120 rotate light polarized in a first state to a second state and vice versa.

An optical signal input from the first port 102 or the second port 128 is typically randomly polarized. However, as discussed above, the polarization of light, even light which is randomly polarized, can be decomposed into a first direction and a second direction. The first direction and second direction are mutually orthogonal and orthogonal to the direction of propagation. Thus, an optical signal can be decomposed into a first portion having a first polarization and a second portion having a second polarization. Thus, as input to the optical circulator 100, an optical signal can be considered to have the first polarization state and the second polarization state.

Referring to FIGS. 2A and 2B, to further illustrate the optical circulator 100 in accordance with the present invention, an optical signal traversing the first optical path and an optical signal traversing the second optical path will be discussed with reference to FIGS. 3A and 4A and FIGS. 3B and 4B, respectively. For clarity of explanation, specific rotations of light polarized in the first and second states will be discussed. However, as discussed above, nothing prevents different polarization rotations from being used. First, an optical signal travelling along the first optical path is discussed. As discussed above, the optical signal input to the first port 102 can be considered to have the first polarization state and the second polarization state because an optical signal is generally randomly polarized. Note, however, that the method and system function effectively for optical signals having a particular polarization, including a polarization encompassing only a single polarization state.

In general, the components in the optical circulator 100 operate to separate the first and second portions of the optical signal based on their polarization states. The polarizations of the first and second portions of the optical signal are then rotated by the first Faraday rotator 110 and the first pair of half wave plates 112 so that the first and second portions pass through the second birefringent material 116 undeflected. The polarizations of the first and second portions are then rotated by the second Faraday rotator 118 and the second pair of half wave plates 120 so that the first and second portions are brought together by the third birefringent material 122. Furthermore, the final polarization of the first portion is preferably orthogonal to its original direction. Similarly, the final polarization of the second portion is preferably orthogonal to its original direction. The following discussion further specifies the operation of the optical circulator 100 for an optical signal traveling along the first optical path.

Figure 3A:
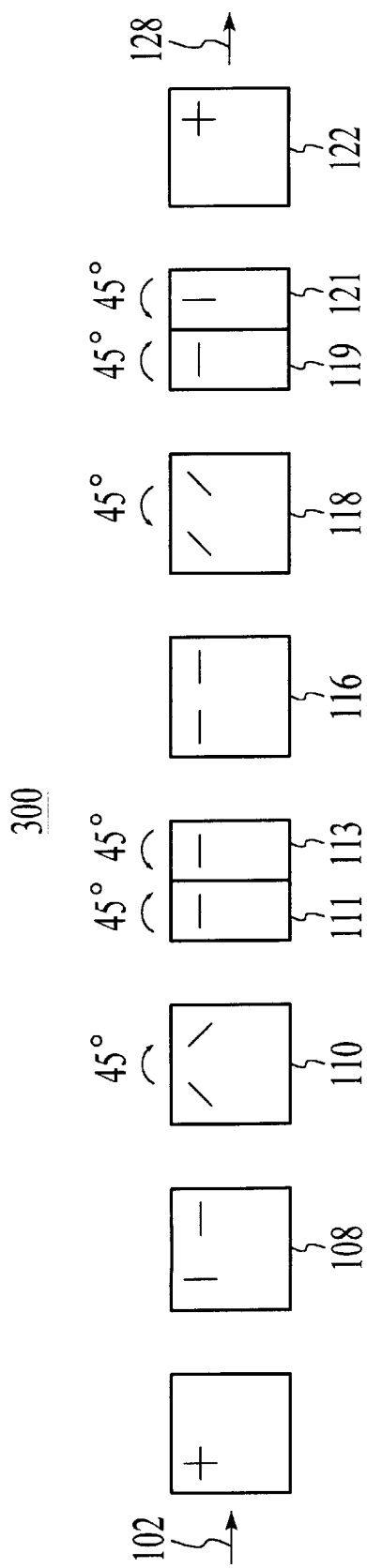
FIG. 3A depicts the polarization after particular components when the optical signal travels along a first optical path in one embodiment of the optical circulator in accordance with the present invention.

FIG. 3A depicts the polarizations after particular components when the optical signal travels along a first optical path, from the first port 102 to the second port 128, in one embodiment of the optical circulator in accordance with the present invention. The first polarization state is depicted as vertical in FIG. 3A, while the second polarization state is horizontal. The polarizations after a particular component in the embodiment of the optical circulator 100 are labeled in the same manner as the component. For example, the polarizations of the first and second portions of the optical signal after transmission by the first birefringent material 108 are labeled 108 in FIG. 3A. Similarly, the polarizations of the first and second portions of the optical signal are labeled 111 and 113 after transmission by the first half wave plate 111 and the second half wave plate 113, respectively.

Referring to FIGS. 2A, 2B and 3A, the optical signal is provided from the fiber for the first port 102 to the first birefringent material 108. The first birefringent material splits the optical signal into a first portion and a second portion. The first portion has the first polarization state, while the second portion has the second polarization state. As discussed above, the first portion traverses the first birefringent material undeflected. However, the second portion having the second polarization state is deflected in a horizontal, (−x) direction. The first and second portions of the optical signal are incident upon the first Faraday rotator 110. The first faraday rotator rotates the polarization of the first and second portions of the optical signal by forty-five degrees around its axis. The first and second portions of the signal are then provided to the first pair of half wave plates 112. The first half wave plate 111 rotates the first portion of the signal by forty-five degrees in one direction around its axis, while the second half wave plate 113 rotates the second portion of the optical signal by forty-five degrees in the opposite direction around its axis. The first half wave plate 111 preferably rotates the first portion of the signal in the same direction as the direction in which first Faraday rotator 110 rotated the polarization of the optical signal. Thus, after the first pair of half wave plates 112, both portions of the optical signal should have polarizations in the second state. Consequently, both portions of the optical signal will be transmitted undeflected by the second birefringent material 116. This is depicted in FIGS. 2A and 3A.

Referring back to FIGS. 2A, 2B and 3A, after transmission by the second birefringent material 116, the polarization of the first and second portions of the optical signal are rotated forty-five degrees by the second Faraday rotator 118. Preferably the second Faraday rotator 118 rotates the first and second portions of the optical signal in the opposite direction from the first Faraday rotator 110. The first and second portions of the optical signal are then provided to the second pair of half wave plates 120. The third half wave plate 119 rotates the polarization of the first portion of the optical signal by forty-five degrees around its axis, while the fourth half wave plate 121 rotates the polarization of the second portion of the optical signal by forty-five degrees in the opposite direction. The third half wave plate 119 preferably rotates the polarization of the first portion of the optical signal in the same direction as the second Faraday rotator 118. Thus, the first portion of the optical signal currently has the second polarization state, while the second portion of the optical signal has the first polarization state. When the first and second portions of the optical signal are transmitted through the third birefringent material 122, the first portion of the optical signal is deflected in the −x direction, while the second portion of the optical signal is transmitted undeflected. Consequently, the first and second portions of the optical signal are recombined. The optical signal can then be output by the second port 128.

The optical circulator 100 functions similarly when an optical signal is input to the second port 128. The second path, traversed when the optical signal is input to the second port 128, is discussed with reference to FIG. 3B. In general, the optical circulator 100 separates the first and second portions of the optical signal based on their polarization states. The polarizations of the first and second portions of the optical signal are then rotated by the second pair of halfwave plates 120 and the second Faraday rotator 118 so that the first and second portions are deflected by the second birefringent material 116. The polarizations of the first and second portions are then rotated by the first pair of half wave plates 112 and the first Faraday rotator 110 so that the first and second portions are brought together by the first birefringent material 108. Furthermore, the final polarization of the first portion is preferably orthogonal to its original direction. Similarly, the final polarization of the second portion is preferably orthogonal to its original direction. The following discussion further specifies the operation of the optical circulator 100 for an optical signal traveling along the second optical path.

Figure 3B:
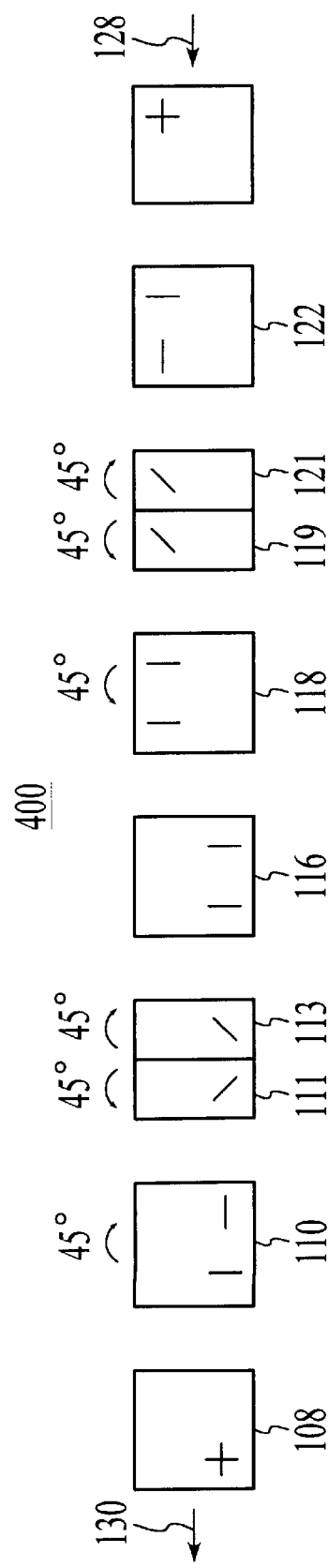
FIG. 3B depicts the polarization after particular components when the optical signal travels along a second optical path in one embodiment of the optical circulator in accordance with the present invention.

FIG. 3B depicts the polarizations after particular components when the optical signal travels along a second optical path, from the second port 128 to the first port 102, in one embodiment of the optical circulator in accordance with the present invention. The first polarization state is depicted as vertical in FIG. 3B, while the second polarization state is horizontal. The polarizations after a particular component in the embodiment of the optical circulator 100 are labeled in the same manner as the component. For example, the polarizations of the first and second portions of the optical signal after transmission by the third birefringent material 122 are labeled 122 in FIG. 3B. Similarly, the polarizations of the first and second portions of the optical signal are labeled 119 and 121 after transmission by the third half wave plate 119 and the fourth half wave plate 121, respectively. Referring to FIGS. 2A, 2B, and 3B, an optical signal input to the second port can also be considered to have a first portion polarized in the first polarization state and a second portion polarized the second polarization state. The optical signal is provided to the third birefringent material 122, which deflects the second portion of the optical signal having the second polarization state in the +x direction. The third birefringent material 122 also allows the first portion of the optical signal to be transmitted undeflected. The second pair of half wave plates 120 then rotates the polarization of the first and second portions of the optical signal. The third half wave plate 119 rotates the polarization of the first portion of the optical signal by forty-five degrees around its axis. The fourth half wave plate 121 rotates the polarization of the first portion of the optical signal by forty-five degrees in the opposite direction. The first and second portions of the optical signal are then provided to the second Faraday rotator 118, which rotates the polarization of both portions of the optical signal by forty-five degrees. The second Faraday rotator preferably rotates the polarization of incident light in the same direction as the fourth half wave plate 121. Thus, the first and second portions of the optical signal both have the second polarization state.

The first and second portions of the optical signal are then provided to the second birefringent material 116. Because both portions of the optical signal have the first polarization state, both portions of the optical signal are deflected down towards the wedge 114. The wedge 114 then deflects both portions of the optical signal so that the optical signal will be provided to the third port. Both portions of the optical signal are transmitted by the wedge and provided to the first pair of half wave plates 112. The first half wave plate 111 rotates the polarization of the second portion of the optical signal by forty-five degrees in one direction, while the second half wave plate 113 rotates the polarization of the first portion of the optical signal in the opposite direction. The first Faraday rotator 110 then rotates the polarization of the first and second portions of the optical signal by forty-five degrees, preferably in the same direction as the direction which the first half wave plate rotated the polarization of the second portion of the optical signal. The first and second portions of the optical signal are then recombined by the first birefringent material 108. However, the optical signal travels to the third port 130 because of the direction which the first and second portions of the optical signal took. The optical signal does not, therefore, reach the first port 102.

Figure 4A:
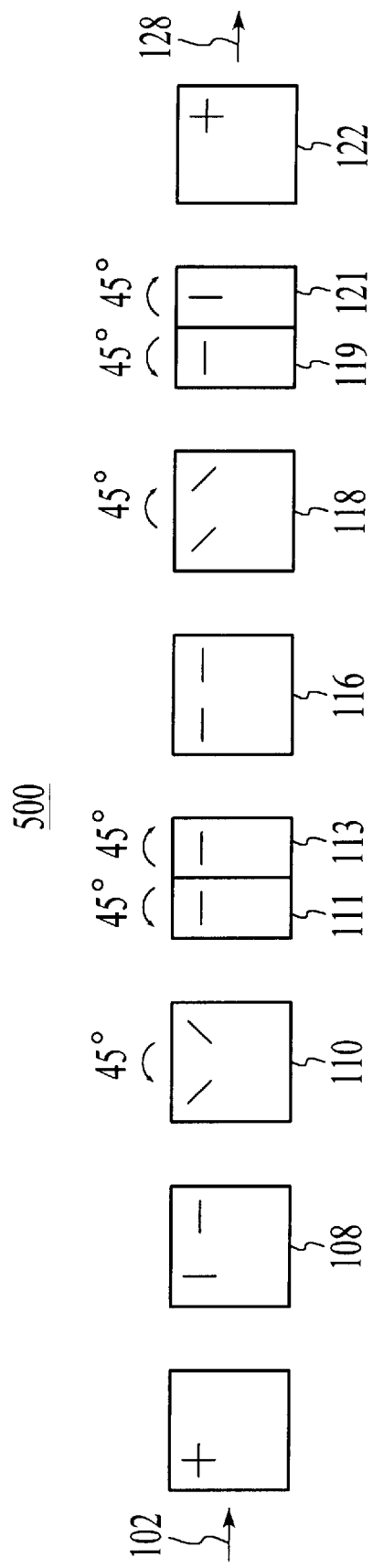
FIG. 4A depicts the polarization after particular components when the optical signal travels along a first optical path in a second embodiment t of the optical circulator in accordance with the present invention.
Figure 4B:
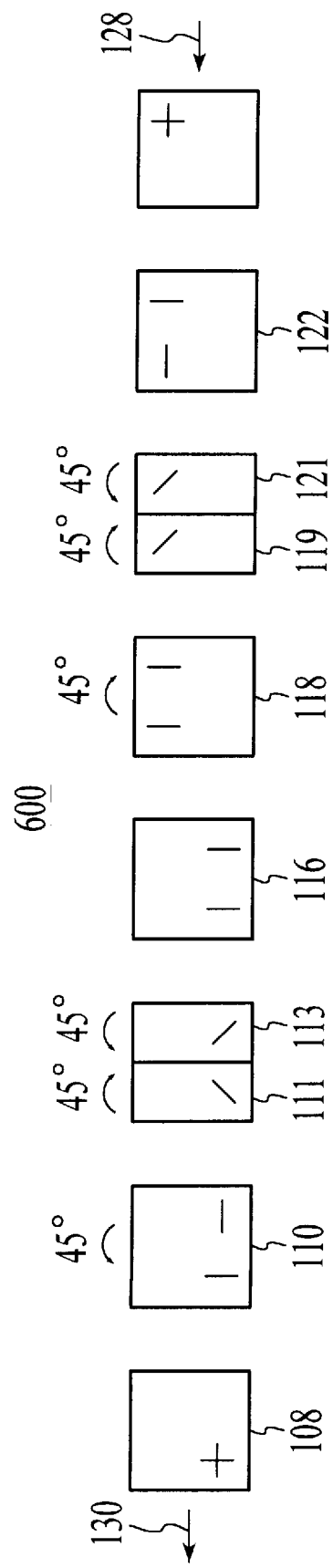
FIG. 4B depicts the polarization after particular components when the optical signal travels along a second optical path in the second embodiment of the optical circulator in accordance with the present invention.

FIG. 4A depicts the polarizations after particular components when the optical signal travels along a first path, from the first port 102 to the second port 128, in a second embodiment of the optical circulator in accordance with the present invention. The first polarization state is depicted as vertical in FIG. 4A, while the second polarization state is horizontal. The polarizations after a particular component in the embodiment of the optical circulator 100 are labeled in the same manner as the component. For example, the polarizations of the first and second portions of the optical signal after transmission by the first birefringent material 108 are labeled 108 in FIG. 4A. Similarly, the polarizations of the first and second portions of the optical signal are labeled 111 and 113 after transmission by the first half wave plate 111 and the second half wave plate 113, respectively. Similarly, FIG. 4B depicts the polarizations after particular components when the optical signal travels along a second path, from the second port 128 to the first port 128, in the second embodiment of the optical circulator in accordance with the present invention. The first polarization state is depicted as vertical in FIG. 4B, while the second polarization state is horizontal. The polarizations after a particular component in the second embodiment of the optical circulator 100 are labeled in the same manner as the component. For example, the polarizations of the first and second portions of the optical signal after transmission by the third birefringent material 122 are labeled 122 in FIG. 4B. Similarly, the polarizations of the first and second portions of the optical signal are labeled 119 and 121 after transmission by the third half wave plate 119 and the fourth half wave plate 121, respectively. FIGS. 4A and 4B describe an optical circulator that functions in a similar manner to the optical circulator described with respect to FIGS. 2A, 2B, 3A, and 3B. However, the direction of rotation of the polarization rotators 110 and 118 and the half wave plates 111, 113, 119, and 121 are reversed.

Thus, the optical circulator 100 provides a first optical path from the first port 102 to the second port 128 and a second optical path from the second port 128 to the third port 130. Because of the presence of the wedge 114 and the second birefringent material 116, the second optical path diverges from the first optical path. Furthermore, as the description above indicates, the optical circulator 100 can be made relatively compact. Moreover, the components of the optical circulator 100 are relatively inexpensive. Consequently, the compact optical circulator 100 can also be made relatively cheaply.

A method and system has been disclosed for providing an optical circulator which may have low losses and be low in cost to manufacture. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An optical circulator comprising:

a first port;

a second port;

a third port means for establishing a first optical path and a second optical path, the first optical path from the first port to the second port, the second optical path from the second port to the third port, the first and second optical path establishing means comprising a wedge intersecting the second optical path and not intersecting the first optical path, the wedge for ensuring the second optical path includes the third port but not the first port by deflecting an optical signal input at the second port but not input at the first port by transmitting the optical signal input at the second port without total internal reflection; and a first birefringent material intersecting the first optical path and the second optical path and being disposed between the wedge and the second port along the second optical path, the first birefringent material for ensuring that the second optical path includes the third port but not the first port and for ensuring that the first optical path includes the second port.

2. The optical circulator of claim 1 wherein the optical signal is capable of being decomposed into a first portion having a first polarization and a second portion having a second polarization, the first and second optical path establishing means further comprise:

a second birefringent material disposed between the first port and the first birefringent material along the first optical path and disposed between the wedge and the third port along the second optical path, the second birefringent material for allowing a first polarization state to be transmitted undeflected and a second polarization state to be transmitted with a first deflection in a first plane at a first angle;

a first polarization rotator having a first axis, the first polarization rotator disposed between the second birefringent material and the first birefringent material along the first optical path and between the wedge and the second birefringent material along the second optical path;

a first pair of half wave plates having a second axis, the first pair of half wave plates being disposed between the first polarization rotator and the first birefringent material along the first optical path and between the wedge and the first polarization rotator along the second optical path, a second polarization rotator having a third axis and being disposed between the first birefringent material and the second port along the first optical path or the second optical path; and a second pair of half wave plates having a fourth axis, the second pair of half wave plates being disposed between the second polarization rotator and the second port;

wherein the first polarization rotator, the second polarization rotator, the first pair of half wave plates and the second pair of half wave,plates provide the first and second portions of the optical signal with the second polarization state at the first birefringent material when the optical signal is along the first optical path and provide the first and second portions of the optical signal with the first polarization state at the first birefringent material when the optical signal is along the second optical path;

wherein the first birefringent material allows the second polarization state to be transmitted undeflected and the first polarization state to be transmitted with a second deflection in a second plane at second angle, the second plane being orthogonal to the first plane.

3. The optical circulator of claim 1 wherein the wedge deflects the optical signal by between approximately 3.6 and 6 degrees.

4. An optical circulator comprising:

a first port;

a second port;

a third port means for establishing a first optical path and a second optical path, the first optical path from the first port to the second port, the second optical path from the second port to the third port, the first and second optical path establishing means comprising a wedge intersecting the second optical path and not intersecting the first optical path, the wedge for ensuring the second optical path includes the third port but not the first port by deflecting an optical signal input at the second port but not input at the first port; and a first birefringent material intersecting the first optical path and the second optical path and being disposed between the wedge and the second port along the second optical path, the first birefringent material for ensuring that the second optical path includes the third port but not the first port and for ensuring that the first optical path includes the second port;

a second birefringent material disposed between the first port and the first birefringent material along the first optical path and disposed between the wedge and the third port along the second optical path, the second birefringent material for allowing a first polarization state to be transmitted without a deflection and a second polarization state to be transmitted with a first deflection in a first plane at a first angle;

a first polarization rotator having a first axis, the first polarization rotator disposed between the second birefringent material and the first birefringent material along the first optical path and between the wedge and the second birefringent material along the second optical path, the first polarization rotator for rotating a first polarization of an optical signal by 45 degrees around the first axis;

a first pair of half wave plates having a second axis, the pair of half wave plates being disposed between the first polarization rotator and the first birefringent material along the first optical path and between the wedge and the first polarization rotator along the second optical path, the first pair of half wave plates for rotating a second polarization of a first portion of the optical signal by 45 degrees around the second axis and rotating a third polarization of a second portion of the optical signal by −45 degrees around the second axis; and a second polarization rotator having a third axis and being disposed between the first birefringent material and the second port along the first optical path or the second optical path, the second polarization rotator for rotating the first polarization of the optical signal −45 degrees around the third axis;

wherein the first birefringent material allows the second polarization state to be transmitted undeflected and the first polarization state to be transmitted with a second deflection in a second plane at second angle, the second plane being orthogonal to the first plane; and wherein the optical signal has a second polarization state at the first birefringent material when traveling along the first optical path and has a first polarization state at the first birefringent material when traveling along the second optical path.

5. The optical circulator of claim 4 wherein the first and second optical path establishing means further comprise:

a second pair of half wave plates having a fourth axis, the second pair of half wave plates intersecting the first optical path and the second optical path and being disposed between the first polarization rotator and the second port along the first optical path or the second optical path, the second pair of half wave plates for rotating the second polarization of the first portion of the optical signal by 45 degrees around the fourth axis and rotating the third polarization of the second portion of the optical signal by −45 degrees around the fourth axis; and a third birefringent material disposed between the second pair of half wave plates and the second port along the first optical path or the second optical path, the third birefringent material for allowing the first polarization state to be transmitted undeflected and the second polarization state to be transmitted with third deflection in the first plane at a third angle, the third deflection being substantially the same as the first deflection;

wherein the first portion has the second polarization state and the second portion has the first polarization state at the third birefringent material when the optical signal is traveling along the first optical path.

6. The optical circulator of claim 5 wherein the first polarization rotator is a first Faraday rotator and the second polarization rotator is a second Faraday rotator.

7. The optical circulator of claim 6 wherein the first port further includes a first fiber, the second port includes a second fiber, and the third port includes a third fiber.

8. The optical circulator of claim 7 further comprising:

a first capillary for holding the first fiber and the third fiber; and a first lens disposed between the capillary and the second birefringent material along the first optical path, the first lens for collimating the optical signal.

9. The optical circulator of claim 8 further comprising:

a second capillary for holding the second optical fiber; and a second lens disposed between the third birefringent material and the second capillary along the first optical path, the second lens for collimating the optical signal.

10. The optical circulator of claim 9 wherein a first portion of the first fiber and a second portion of the third fiber are separated by approximately 1.89 degrees within the first capillary.

11. A method for transferring an optical signal in an optical circulator having a first port, a second port and a third port, the method transferring the optical signal input at the first port to the second port along a first optical path and transferring the optical signal input at the second port to the third port along a second optical path, the method comprising the steps of:

(a) passing the optical signal through means for establishing the first optical path and the second optical path, the first optical path from the first port to the second port, the second optical path from the second port to the third port, the step of passing the optical signal through the first and second optical path establishing means comprising the steps of (a1) passing the optical signal input at the second port through a wedge intersecting the second optical path and not intersecting the first optical path, the wedge for ensuring the second optical path includes the third port but not the first port by deflecting an optical signal input at the second port but not input at the first port by transmitting the optical signal input at the second port without total internal reflection; and (a2) passing the optical signal input at the first port or the second port through a first birefringent material intersecting the first optical path and the second optical path and being disposed between the wedge and the second port along the second optical path, the first birefringent material for ensuring that the second optical path includes the third port but not the first port and for ensuring that the first optical path includes the second port.

12. The method of claim 11 further wherein the optical signal is capable of being decomposed into a first portion having a first polarization and a second portion having a second polarization and wherein the step of passing the optical signal through the first and second optical path providing means further includes the steps of:

(a3) passing the optical signal through a second birefringent material disposed between the first port and the first birefringent material along the first optical path and disposed between the wedge and the third port along the second optical path, the second birefringent material for allowing a first polarization state to be transmitted undeflected and a second polarization state to be transmitted with a first deflection in a first plane at a first angle;

(a4) passing the optical signal through a first polarization rotator having a first axis, the first polarization rotator disposed between the second birefringent material and the first birefringent material along the first optical path and between the wedge and the second birefringent material along the second optical path;

(a5) passing the optical signal through a first pair of half wave plates having a second axis, the first pair of half wave plates being disposed between the first polarization rotator and the first birefringent material along the first optical path and between the wedge and the first polarization rotator along the second optical path, (a6) passing the optical signal through a second polarization rotator having a third axis and being disposed between the first birefringent material and the second port along the first optical path or the second optical path; and (a7) passing the optical signal through a second pair of half wave plates having a fourth axis, the second pair of half wave plates being disposed between the second polarization rotator and the second port;

wherein the first polarization rotator, the second polarization rotator, the first pair of half wave plates and the second pair of half wave plates provide the first and second portions of the optical signal with the second polarization state at the first birefringent material when the optical signal is along the first optical path and provide the first and second portions of the optical signal with the first polarization state at the first birefringent material when the optical signal is along the second optical path;

wherein the first birefringent material allows the second polarization state to be transmitted undeflected and the first polarization state to be transmitted with a second deflection in a second plane at second angle, the second plane being orthogonal to the first plane.

13. A method for transferring an optical signal in an optical circulator having a first port, a second port and a third port, the method transferring the optical signal input at the first port to the second port along a first optical path and transferring the optical signal input at the second port to the third port along a second optical path, the method comprising the steps of:

(a) passing the optical signal through means for establishing the first optical path and the second optical path, the first optical path from the first port to the second port, the second optical path from the second port to the third port, the step of passing the optical signal through the first and second optical path establishing means comprising (a1) passing the optical signal through a wedge intersecting the second optical path and not intersecting the first optical path, the wedge for ensuring the second optical path includes the third port but not the first port by deflecting an optical signal input at the second port but not input at the first port;

(a2) passing the optical signal through a first birefringent material intersecting the first optical path and the second optical path and being disposed between the wedge and the second port along the second optical path, the first birefringent material for ensuring that the second optical path includes the third port but not the first port and for ensuring that the first optical path includes the second port;

(a3) passing the optical signal through a second birefringent material disposed between the first port and the first birefringent material along the first optical path and disposed between the wedge and the third port along the second optical path, the second birefringent material for allowing a first polarization state to be transmitted without a deflection and a second polarization state to be transmitted with a first deflection in a first plane at a first angle;

(a4) passing the optical signal through a first polarization rotator having a first axis, the first polarization rotator disposed between the second birefringent material and the first birefringent material along the first optical path and between the wedge and the second birefringent material along the second optical path, the first polarization rotator for rotating a first polarization of an optical signal by 45 degrees around the first axis;

(a5) passing the optical signal through a first pair of half wave plates having a second axis, the pair of half wave plates being disposed between the first polarization rotator and the first birefringent material along the first optical path and between the wedge and the first polarization rotator along the second optical path, the first pair of half wave plates for rotating a second polarization of a first portion of the optical signal by 45 degrees around the second axis and rotating a third polarization of a second portion of the optical signal by −45 degrees around the second axis; and (a6) passing the optical signal through a second polarization rotator having a third axis and being disposed between the first birefringent material and the second port along the first optical path or the second optical path, the second polarization rotator for rotating the first polarization of the optical signal −45 degrees around the third axis;

wherein the first birefringent material allows the second polarization state to be transmitted undeflected and the first polarization state to be transmitted with a second deflection in a second plane at second angle, the second plane being orthogonal to the first plane; and wherein the optical signal has a second polarization state at the first birefringent material when traveling along the first optical path and has a first polarization state at the first birefringent material when traveling along the second optical path.

14. The method of claim 13 wherein the step of passing the optical signal through the first and second optical path establishing means further comprises the steps of:

(a7) a second pair of half wave plates having a fourth axis, the second pair of half wave plates intersecting the first optical path and the second optical path and being disposed between the first polarization rotator and the second port along the first optical path or the second optical path, the second pair of half wave plates for rotating the second polarization of the first portion of the optical signal by 45 degrees around the fourth axis and rotating the third polarization of the second portion of the optical signal by −45 degrees around the fourth axis; and (a8) a third birefringent material disposed between the second pair of half wave plates and the second port along the first optical path or the second optical path, the third birefringent material for allowing the first polarization state to be transmitted undeflected and the second polarization state to be transmitted with third deflection in the first plane at a third angle, the third deflection being substantially the same as the first deflection;

wherein the first portion has the second polarization state and the second portion as the first polarization state at the third birefringent material when the optical signal is traveling along the first optical path.

* * * * *